United States Patent [19]

Romand-Monnier et al.

[11] Patent Number: 4,500,226
[45] Date of Patent: Feb. 19, 1985

[54] COUPLING DEVICE, AN ELECTRIC MOTOR FITTED WITH SAID DEVICE AND A METHOD OF COUPLING TWO ELECTRIC MOTORS TOGETHER

[75] Inventors: Jacques Romand-Monnier, Delle; Jean-Pierre Lejeune, Beaucourt, both of France

[73] Assignee: Alsthom-Atlantique, Paris, France

[21] Appl. No.: 483,305

[22] Filed: Apr. 8, 1983

[30] Foreign Application Priority Data

Apr. 15, 1982 [FR] France ............................... 82 06487

[51] Int. Cl.³ .............................................. F16D 1/00
[52] U.S. Cl. ..................... 403/13; 403/359; 403/286; 403/342; 285/388; 310/112
[58] Field of Search ................ 403/359, 13, 286, 342, 403/299; 310/112, 113, 114; 285/387, 388, 92; 417/424; 415/122

[56] References Cited

U.S. PATENT DOCUMENTS

| | | | |
|---|---|---|---|
| 1,517,761 | 12/1924 | Sorensen et al. | 403/342 X |
| 1,564,965 | 12/1925 | Kraft | 285/387 X |
| 2,098,958 | 11/1937 | Ekstromer . | |
| 2,240,569 | 5/1941 | Myers | 310/112 |
| 2,497,987 | 2/1950 | Goode | 285/387 X |
| 3,162,457 | 12/1964 | Iacco | 403/342 X |
| 3,255,367 | 6/1966 | Schaefer | 310/112 |
| 3,853,430 | 12/1974 | O'Rourke | 417/424 X |
| 4,257,714 | 3/1981 | Hankosky | 403/335 X |

FOREIGN PATENT DOCUMENTS

| | | | |
|---|---|---|---|
| 809428 | 3/1937 | France | 285/387 |
| 1417976 | 10/1965 | France . | |
| 833802 | 4/1960 | United Kingdom | 403/242 |

Primary Examiner—Richard J. Scanlan, Jr.
Attorney, Agent, or Firm—Sughrue, Mion, Zinn, Macpeak and Seas

[57] ABSTRACT

The device allows the shafts 5 and 20 to be coupled together on a trial and error basis, said shafts being recessed relative to the ends of the stationary stators. The shaft ends have splines 6 and 21 and are coupled by means of a sleeve 22. Before coupling, the shafts are reference marked relative to the stationary portion by means of cams 27 (and 36 which is not shown in the figure) which enter a groove 6 in the shaft 5 and in a groove of the sleeve 22. During the coupling operation, the cams are retracted by a part 37 at the end of a rod 34 which bears against the cam support yoke 35 for the cam 36 in the case of the cam 27 and by the end 48 of the body in the case of the cam 36. The bodies are connected together by a coupling sleeve 9.

6 Claims, 4 Drawing Figures

COUPLING DEVICE, AN ELECTRIC MOTOR FITTED WITH SAID DEVICE AND A METHOD OF COUPLING TWO ELECTRIC MOTORS TOGETHER

The present invention relates to a device for coupling two units each of which has a stationary body and a coaxial rotating shaft.

BACKGROUND OF THE INVENTION

The invention applies in particular but not exclusively to coupling two heavy long motors together vertically. This applies to motor pump assemblies for pumping in oil wells, for example. In such a case, generally three motors are coupled together one above the other. The bodies are coupled together by bolted flanges and the shafts are coupled together by splined sleeves. Connectors fitted with pins and sockets supported by insulating parts provide electrical connection. The kinetics of the coupling operation is as follows: contact between shafts and sleeves, contact of the electric connectors and lastly contact of the bodies.

Such kinetics entails the use of detachable auxiliary systems which allow relative angular and axial positioning of the two motors which are to be coupled together.

In the above operational mode, the fragile parts, i.e. the splined shafts and the electric connectors, are coupled together first and therefore there is a danger of damage in the case of faulty handling or of imperfect alignment and further the operation is dangerous since the operation must intervene during the lowering of the upper motor towards the lower motor to suitably position the shafts, faulty operation by the crane operator then being certain to injure the operator's hands.

SUMMARY OF THE INVENTION

Preferred embodiments of the present invention overcome these drawbacks and provides a device for coupling two units each of which has a stationary body and a coaxial rotating shaft, wherein the end of the body of the second unit has an outer male cylindrical coupling bearing portion ending in a stop shoulder, the end of the body of the first unit having a corresponding female coupling bore; wherein the shaft end of each unit is splined and is recessed relative to the end of its body; wherein for each unit it has a relative positioning and blocking means for its shaft relative to its body at the time of coupling, means allowing the rotating shafts to be released towards the end of the coupling process and means for relative angular positioning of the bodies of the two units, the shafts being coupled by a sleeve with a splined inside surface and the bodies being made fast in the coupled position by a coupling sleeve screwed onto the body of the first unit and having its axial movement limited by a stop on the body of the second unit. According to a preferred embodiment of the invention, said shaft positioning and locking means relative to the body has a cam which rotates on a shaft perpendicular to the axis of the shafts and stationary relative to the body, said cam being urged to rotate on its axis by a spring and its rotation being limited by a stop and at least one groove being provided which is intended to co-operate with said cam, said groove being connected to the shaft.

According to a particular disposition, said groove is constituted, in the case of the shaft of said second unit, by any sort of spline on the end of the shaft and wherein said groove is constituted, in the case of said first unit, by an axial groove formed on the outside diameter of said shaft coupling sleeve at least in the portion of the sleeve which covers the end of the shaft of said first unit.

The means which allow the rotating shafts to be released are constituted by parts which, at the end of the coupling operation, bear against said cams and to be made to tilt in the opposite direction to the urging of their respective springs. According to one embodiment, at least one male pin of an electric connector is fitted on the body of one of the units and the other unit is fitted with at least one corresponding socket, the axial position of said socket and of said pin in each unit being such that their interpenetration begins only after the beginning of the shaft coupling operation.

The relative angular positioning means of the bodies have at least one pin and a corresponding groove.

The invention also provides an electric motor having coupling means such as defined hereinabove, one end of its body being identical to said end of the body of said first unit and the other end of its body being identical to said end of the body of said second unit.

The invention also further provides a method of coupling two electric motors such as defined hereinabove, wherein there is a succession of operations as follows:

a first motor is placed in a vertical well and held by a handling device;

a second motor is suspended above the first by a hoisting means in the direction corresponding to male-to-female coupling relative to the top end of the first motor;

one of said coupling sleeves is placed at the end of a shaft of the first motor and possibly makes the shaft rotate so that said cam enters said groove of the sleeve;

the cam of the first motor is checked to see that it engages in one of the splines of the shaft;

the second motor is aligned with the first motor;

the second motor is lowered until the respective ends of the bodies are about one centimeter apart;

the second motor is orientated so as to make said pin coincide with said groove;

lowering is continued until the shoulder of said male bearing portion abuts against the end of the corresponding female bore; and the coupling sleeve is screwed onto the bodies and is blocked by means of a screw with a pointed end.

Thus, due to the invention which allows the shafts to be reference-marked relative to the bodies, it is sufficient to correctly orient said bodies relative to each other to ensure correspondance of the splines of the two shafts and also, where applicable, of the electric connectors when two electric motors are coupled together. It is thus easy to couple shafts and if need be the electrical connectors together on a trial and error basis when they are recessed relative to the bodies without danger of damaging them since the first contact is that of the bodies and the only angular positioning that needs to be performed is performed on the bodies. This minimizes danger to the operator. Another advantage of the invention resides in the lack of small independent parts such as bolts. Indeed, the only independent part of the units to be coupled together and set in position at the time of coupling consists of the shaft coupling sleeve.

BRIEF DESCRIPTION OF THE DRAWINGS

The invention will be better understood from the following description of an embodiment given by way of example with reference to the accompanying drawings in which.

MORE DETAILED DESCRIPTION

Figure 1:
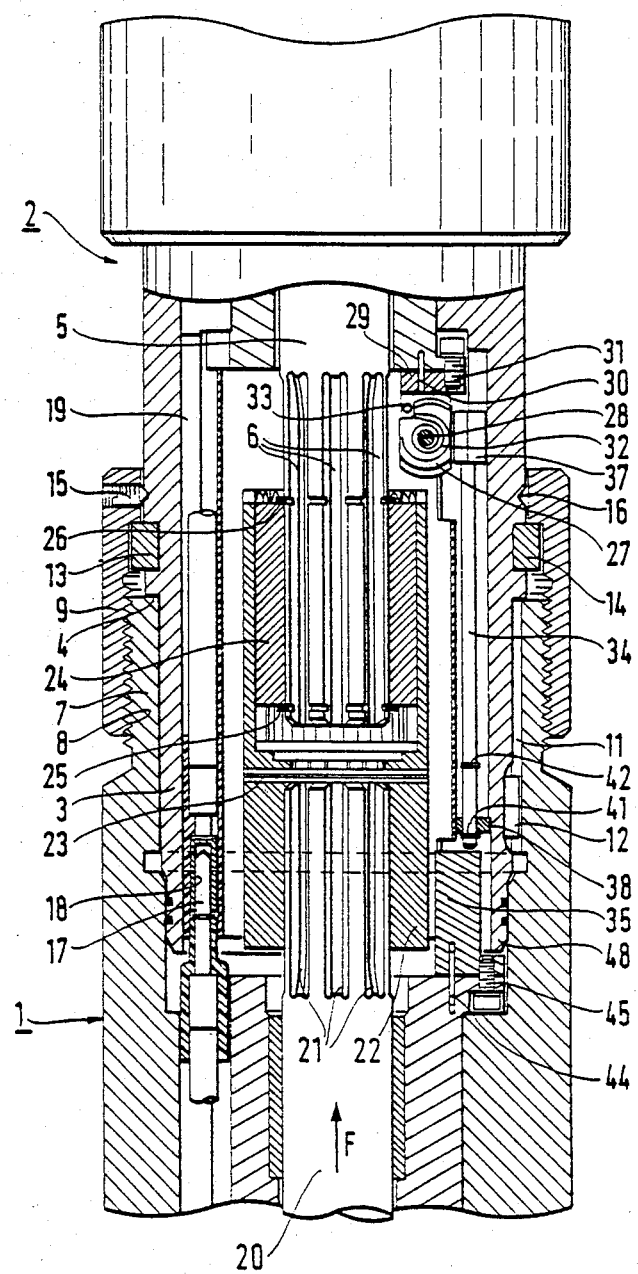
FIG. 1 is a partial section through two coupled electric motors showing the coupling components by illustrating the top of a first motor and the bottom of a second motor.
Figure 2:
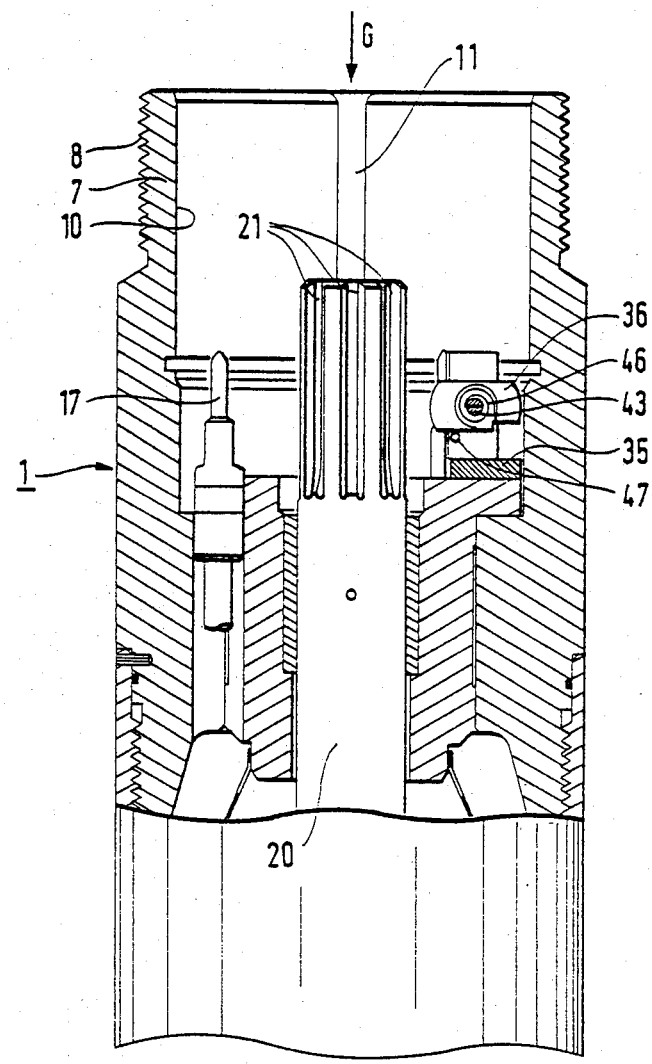
FIG. 2 is a section along a line II—II of FIG. 3 through the top end of the first motor before coupling.

FIG. 1 shows the coupled ends of two electric motors. One of these motors is referenced 1 and the other is referenced 2. Said figure shows only a small portion of each of them showing mainly their coupling means, i.e. it shows the top end of the lower motor 1 and the bottom end of the upper motor 2. FIG. 2 shows the top end of the lower motor 1 before coupling, said end being identical to the top end of the motor 2 since the two motors are identical.

Hereinafter, the stationary outer portion of each motor is referred to as the body, regardless of whether said portion acts as a bearing or has some other function and even though the motor bodies are constituted by a plurality of interconnected parts. Further, the description of one end of one motor also applies to the equivalent end of the other motor. Thus, the bottom end of the body of the motor 2 has a male cylindrical outer coupling bearing portion 3 which ends in a shoulder 4. Said bearing portion is coaxial with a shaft 5 having one end splined at 6. As illustrated, the end of the shaft is recessed an appreciable distance relative to the end of the body.

The top end of the body of the motor 1 has a cylindrical bearing portion 7 which has a thread 8 on its outside to accomodate a coupling sleeve 9 fitted on the bottom end of the motor 2 and having a female coupling bore 10 whose diameter corresponds to the outside diameter of the male bearing portion 3. A number of key grooves such as 11 illustrated in FIG. 2 are machined in the bore 10 to cooperate with pins or keys such as 12, FIG. 1, carried by the male bearing portion 3 so as to angularly position the bodies of the motors 1 and 2. When the body coupling sleeve 9 is screwed on the parts to be coupled, its axial movement is limited by a stop 13 constituted by two half shells placed in a groove 14 beyond the shoulder 4 of the male bearing portion 3. The rotation of the sleeve 9 is blocked by a pointed-end screw 15 which enters a V-shaped groove 16.

Three male pins such as 17 are connected to the stator winding of the motor 1 and fixed to the upper end of the body of the motor 1 in the bore 10 and three corresponding sockets such as 18 are connected to the stator winding of the motor 2 and fixed to the lower end of the body of the motor 2 in the bore 19 of the body. Said pins and said sockets make it possible to electrically connect the stators of the two motors together. The lower motor 1 has a shaft 20 which is identical to the shaft 5 of the motor 2 since the motors are identical and its top end has splines 21. Said shaft end is also recessed by an appreciable distance relative to the end of the body.

The shafts are coupled together by means of a coupling sleeve 22 which has a splined inside surface. It is placed fully home against the end of the shaft 20 by means of a stop pin 23.

An intermediate sleeve 24 with splines on both its inside and its outside surfaces is installed on the splines 6 of the shaft 5 and is axially stopped by means of two circlips 25 and 26. The coupling sleeve 22 fits into said intermediate sleeve 24 which reduces the contact pressure by increasing the diameter of the shaft 5 and allowing it to slide freely in the coupling sleeve 22 when the shaft 5 expands and retracts.

To be able to couple the shafts together on a trial and error basis, and since the bodies penetrate into each other before the shafts begin to be coupled together, a device is provided which allows guide marks relative to the bodies to be provided on the shafts.

For the above purpose, a cam 27 is supported by a shaft 28 installed in a yoke 29 positioned in the body of the motor 2 at its bottom end by a stud 30 and fixed by a screw 31. The cam 27 is held in front of the coupling in a spline of the shaft 5 by means of a spiral spring 32 and of a stop 33. When the motors are coupled together, a rod 34 bears against a yoke 35 which is intended to support a cam 36 (FIG. 2) of the top end of the motor 1 to reference the shaft 20 relative to the body of the motor 1.

Figure 4:
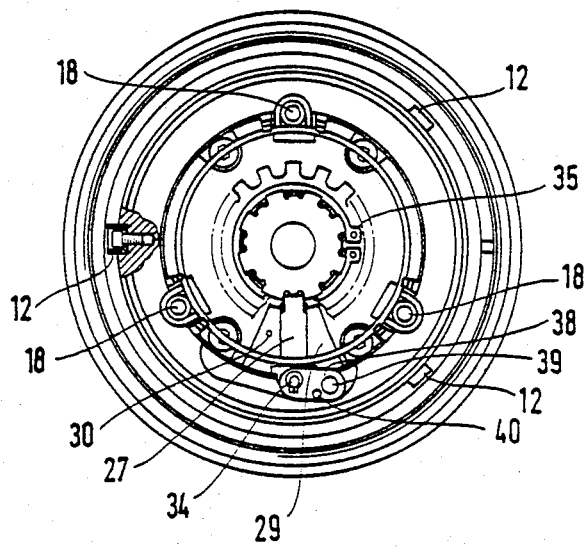
FIG. 4 is an end view looking up along an arrow F in FIG. 1 and showing the motors uncoupled.

The rod 34 is integral with a block 37 which bears against the cam 27 and makes it tilt, thereby releasing the shaft 5. The rod 34 is guided transversally by a part 38 fixed and positioned by a screw 39 and a stud 40 (FIG. 4). Two circlips 41 and 42 limit the travel of the rod 34.

Figure 3:
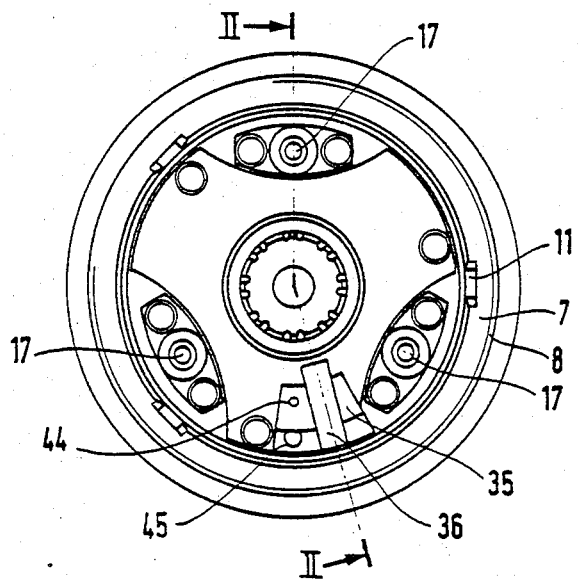
FIG. 3 is an end view looking down along an arrow G in FIG. 2.

The cams 27 and 36 are respectively situated at the bottom and top ends of the motors are angularly shifted by 15°. That is why the cam 36 is illustrated in FIG. 2 which is a cross-section through II—II of FIG. 3, but not in FIG. 1.

The cam 36 at the top end of the motor 1 pivots on a shaft 43 installed in the yoke 35 which is positioned by a stud 44 and fixed by a screw 45.

Before coupling, the cam is held in a groove of the shaft coupling sleeve 22 by a spiral spring 46 and a stop 47.

When the motors are coupled together, the end 48 of the male bearing portion 3 of the motor 2 abuts against the cam 36 and makes it tilt, thereby releasing the rotating shaft 20. In the initial state, the motor 1 is placed in an oil well and is supported by a handling system fixed to the top end of the motor.

The motor 2 is suspended from a hoisting means. A sleeve 22 is placed at the end of the shaft of the lower motor 1 and the shaft 20 of said motor is rotated so that the cam 36 pushed by its spring 46 enters the groove, not shown in the figures, of the coupling sleeve 22.

The cam 27 of the upper motor 2 is checked to see that it engages in a spline 6 of the shaft 5 and if it does not the shaft 5 is rotated so that the cam 27 does enter a spline 6.

The upper motor 2 is brought into line with the lower motor 1 and the upper motor is lowered until the ends of the bodies are about 1 cm apart. The upper motor is then orientated so as to align the keys 12 with key grooves of the bodies and lowering is continued until the male bearing portion 3 abuts against the shoulder 4. The coupling sleeve 9 is then screwed on and its rotation is stopped by tightening the screw 15.

The kinetics of the coupling operation is as follows: the male bearing portion 3 of the upper motor 2 enters the bore 10 of the lower motor 1. The penetration of the pins or keys 12 into their recesses after about 30 mm of travel causes the angular positioning of the two motors. From that moment onwards, the splines on the sleeves 22 and 24 are aligned due to the positions guide marks on the shafts relative to the bearing portions. Then, the intermediate sleeve 24 enters the coupling sleeve 22 after about 40 mm of travel, the shafts thereby being coupled together and lastly, after about 80 mm of travel, electric connection is established and simultaneously the cams 27 and 36 retract.

We claim:

1. A device for coupling first and second units, each of which has a stationary body and a coaxial rotating shaft, wherein; the end of the body of the second unit has an outer male cylindrical coupling bearing portion shoulder, the end of the body of the first unit having a corresponding female coupling bore receiving said male cylindrical coupling bearing portion; the shaft end of each unit is splined and is axially recessed relative to the end of the unit body; each unit further having an automatic shaft relative positioning and blocking means for its shaft relative to its body at the time of coupling, means for releasing said automatic shaft relative positioning and blocking means allowing the rotating shafts to be released at the end of the coupling process and means for relative angular positioning of the bodies of the two units, a shaft coupling sleeve with splined inside surfaces for coupling said shafts and a body coupling sleeve rotatably mounted on the body of the second unit and screwed onto the body of the first unit, a first stop on the body of said second unit engageable with said first unit body for terminating axial movement of said first unit relative to said second unit, a second stop on the body of said second unit engageable with said body coupling sleeve for terminating movement of said body coupling sleeve thereby making said bodies fast in the coupled postion.

2. A coupling device according to claim 1, wherein, for each unit, said shaft positioning and blocking means relative to the body includes a cam mounted on the body for rotational engagement with and along the axis of on the shaft of said unit perpendicular to the axis of the shaft and, a spring for urging said cam to rotate on its axis, a stop for limiting rotation of said cam and at least one groove operatively borne by the shaft of said unit and engaging said cam.

3. A coupling device according to claim 2, wherein said groove is constituted, in the case of the shaft of said second unit, by said spline on the end of the shaft and wherein said groove comprises, in the case of the shaft of said first unit, an axial groove formed on the outside surface of said shaft coupling sleeve, at least within the portion of the shaft coupling sleeve which covers the end of the shaft of said first unit.

4. A coupling device according to claim 3, wherein the means which allow the rotating shafts to be released are constituted by parts which, at the end of the coupling operation, bear against said cams to cause them to tilt in the opposite direction to the urging of their respective springs.

5. A coupling device according to claim 1, wherein the relative angular positioning means of the bodies comprises at least one pin and a corresponding groove.

6. An electric motor having coupling means for coupling two units, each of which has a stationary body and a coaxial rotating shaft, and wherein the end of the body of the second unit has an outer male cylindrical coupling bearing portion ending, the end of the body of the first unit having a corresponding female coupling bore receiving said outer male cylindrical coupling bearing portion; the shaft end of each unit being splined and being axially recessed from the end of its body; and wherein, for each unit, said unit has a positioning and blocking means for its shaft relative to the body of said unit at the time of coupling, automatic means for operating said positioning and blocking means to release the rotating shaft at the end of the coupling process, and means for relative angular positioning of the bodies of the two shafts, a sleeve with splined inside surfaces for coupling said shafts and a coupling sleeve rotatably mounted on the body of said second unit and screwed onto the body of the first unit, a first stop on the body of the second unit engageable with said first unit body for limiting axial movement of said first body relative to said second body, a second stop on the body of the second unit engageable with said body coupling sleeve for terminating movement of said body coupling sleeve thereby making said bodies fast in the coupled position.

* * * * *